(12) United States Patent
Das

(10) Patent No.: US 7,213,011 B1
(45) Date of Patent: May 1, 2007

(54) EFFICIENT PROCESSING OF MULTI-COLUMN AND FUNCTION-BASED IN-LIST PREDICATES

(75) Inventor: Dinesh Das, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 743 days.

(21) Appl. No.: 10/118,762

(22) Filed: Apr. 8, 2002

(51) Int. Cl.
*G06F 17/30* (2006.01)

(52) U.S. Cl. ............... 707/2; 707/4; 707/5; 707/6; 707/101; 707/102

(58) Field of Classification Search ........... 707/1–10, 707/100–104.1, 200–206
See application file for complete search history.

(56) References Cited

U.S. PATENT DOCUMENTS

| | | | | |
|---|---|---|---|---|
| 5,598,559 A | * | 1/1997 | Chaudhuri ............... | 707/2 |
| 5,732,258 A | * | 3/1998 | Jakobsson et al. ....... | 707/4 |
| 5,995,957 A | * | 11/1999 | Beavin et al. ........... | 707/2 |
| 6,272,487 B1 | * | 8/2001 | Beavin et al. ........... | 707/2 |
| 6,289,334 B1 | * | 9/2001 | Reiner et al. ............ | 707/3 |
| 6,353,826 B1 | * | 3/2002 | Seputis ................... | 707/5 |
| 6,397,204 B1 | * | 5/2002 | Liu et al. ................. | 707/2 |
| 6,446,063 B1 | * | 9/2002 | Chen et al. .............. | 707/4 |
| 6,513,028 B1 | * | 1/2003 | Lee et al. ................. | 707/2 |
| 6,529,896 B1 | * | 3/2003 | Leung et al. ............ | 707/2 |
| 6,665,663 B2 | * | 12/2003 | Lindsay et al. .......... | 707/4 |
| 6,757,671 B1 | * | 6/2004 | Galindo-Legaria et al. | 707/3 |
| 6,792,420 B2 | * | 9/2004 | Stephen Chen et al. ... | 703/3 |
| 6,947,934 B1 | * | 9/2005 | Chen et al. .............. | 707/7 |

* cited by examiner

*Primary Examiner*—Diane D. Mizrahi
(74) *Attorney, Agent, or Firm*—Hickman Palermo Truong & Becker LLP

(57) ABSTRACT

Described herein are approaches for generating execution plans for database commands that include an in-list predicate. The approaches can be used to generate execution plans that exploit the power of in-list iterators in ways and under circumstances not previously supported by conventional DBMSs. An in-list iterator may be used with execution subplans for processing multi-column in-list queries. An in-list iterator is used with execution subplans that scan function-based indexes. The execution plans for a multi-column in-list query limit table scans to only table partitions that contain data that satisfy the query.

20 Claims, 10 Drawing Sheets

EFFICIENT PROCESSING OF MULTI-COLUMN AND FUNCTION-BASED IN-LIST PREDICATES

FIELD OF THE INVENTION

The present invention relates to processing database commands, and in particular, to processing commands that contain IN operators.

BACKGROUND OF THE INVENTION

When a database management system (DBMS) receives a statement representing a request to perform a database operation, the DBMS may generate an execution plan. An execution plan is important—it defines the steps and operations performed by a DBMS to carry out a request. The statement used to request database operations may be in the form of a database command that conforms to a database language, such as Structured Query Language (SQL).

DBMSs generate execution plans that are optimized for efficiency. When determining what steps to include in an execution plan, and the order in which the steps are performed, a DBMS accounts for many factors that affect efficiency. For example, a query may request rows that contain a first value in a first column and a second value in a second column. If the first column is indexed, then a DBMS may generate an execution plan that uses the index to access data more efficiently. Such an execution plan may include the following steps, executed in the order indicated below.

1. Access the index and generate row ids of rows that contain the first value in the first column.
2. Obtain the set of rows identified by the row ids.
3. Filter the set of rows for the second value in the second column.

ILLUSTRATIVE EXECUTION PLAN DIAGRAM

Execution plans can be represented by execution plan diagrams. FIG. 1 is an execution plan diagram provided to illustrate various features of execution plans. Referring to FIG. 1, it shows execution plan 102 generated for query 104. Query 104 is a database command that conforms to SQL.

Query 104 contains in-list predicate 106, i.e. F1.a IN (1,2,3). A query containing an in-list predicate is used to illustrate execution plans because the present invention provides approaches for executing database commands that contain in-list predicates. A query containing an in-list predicate is referred to herein as an in-list query.

A predicate is a logical expression that defines criteria that must be satisfied by rows. An in-list predicate contains an IN operator, which takes two arguments. One argument is a set of values referred to as an in-list. The other argument is referred to herein as a column argument, because the other argument references a column. A row satisfies an in-list predicate if the value for the column is "IN" the in-list. An in-list predicate in query 104 defines a condition that is satisfied by a row when the value column F1.a contains a value in the in-list (1,2,3).

A query execution plan comprises steps referred to as "plan operators". A plan operator defines a set of operations that are performed in an execution plan and that may be executed by a DBMS to access one or more row sources. A row source may be data stored in a database (e.g. rows in a table), or output rows of another plan operator.

In execution plan 102, plan operators are depicted using blocks. Branches between a parent operator and a child operator represent a flow of rows from the child operator to the parent operation. Thus, the output rows of a child operator are a row source to a parent operator. Plan operators are described herein as performing the operations that the plan operators themselves define. However, this is simply a convenient way of expressing that a DBMS is performing the operations defined by a plan operator when the DBMS executes the plan operator.

Index scan 153 performs an index scan, scanning the indexed column F1.a. for rows indexed to value 1. A column whose values are indexed by an index is herein referred to as a key. The values in a key are referred to as key values. Index scan 153 generates output rows, where each row contains a row id of a row in table F1 that has key value 1. Table row id access 152 retrieves rows from table F1 identified by the output of index scan 153.

Index scan 155 scans an index that indexes F2.b, scanning the index for rows indexed to key value 1, and returning output rows that contain row ids of a row from table F2 having the key value 1. Table row id access 154 retrieves rows from table F2 that are identified by row ids in the output of index scan 155.

Nested loop operation 156 performs a join operation, joining the rows from table row id access 152 with the rows from table row id access 154. Union-all 120 performs a union-all operation, generating, as output rows, the union all of row sources, by simply merging the row sources. No duplicate rows are removed. A union-all operation is an example of a pass-through operation, because the operation's output is simply the operation's row sources. The rows in the row source are not modified or filtered in any way.

Execution plans are explained in chapter 22–24 of *Oracle 8i Concepts*, by Oracle Corporation, February, 1999. The contents of *Oracle 8i Concepts* are incorporated herein by reference.

Execution plan 102 is an example of a type of execution plan referred to as an or-expansion. An or-expansion is the union-all of row sources generated from veritable copies of the same sub plan, where there is a copy of the sub-plan for each in-list value. Union-all 120 generates a union-all of row sources from execution subplans 150, 160, and 170. As FIG. 1 shows, execution subplans 150, 160, and 170 are veritable copies of each other, each specifying the same type of operations interrelated by the same branch relationships. Execution subplan 150 corresponds to in-list value 1, execution subplan 160 to in-list value 2, and execution subplan 170 to in-list value 3.

For queries with many in-list values in an in-list predicate, or-expansions can be very expensive, including many execution subplan copies. Such or-expansions are expensive and inefficient to process for at least several reasons. First, they require more memory to execute. For each plan operator in an execution plan, an initial amount of memory is allotted. The more operators in an execution plan, the more memory that is allotted. Memory is also needed to store data structures that define the execution plan. These data structures can require relatively excessive amounts of memory. If the execution subplans contain an "expensive" plan operator that requires a lot of processing, such as a full table scan, the expensive plan operator may be repeated for each in-list value.

To overcome this problem, some DBMSs are configured to create execution plans based on a type of plan operator referred to as an in-list iterator. An in-list iterator iteratively executes an execution subplan for each value in an in-list. Each in-list value may affect one or more parameters of the operators in an execution subplan. For example, an execution subplan may include an index scan. Each value in the in-list is a key value scanned for execution of a scan operation. In this way, the in-list value affects a parameter of an index scan operation.

FIG. 2 is an execution plan diagram depicting an execution plan that exploits an in-list iterator to execute in-list query 104. Referring to FIG. 2, it shows execution plan 202. In-list iterator 222 iterates through each value in in-list predicate 106, executing execution subplan 230 in each iteration. The first iteration is performed for in-list value 1. In this iteration, index scan 234 performs an index scan, scanning the index of key column F1.a for rows indexed to key value 1. Index scan 234 returns rows that contain row ids of a row in table F1 that has key value 1. Table row id access 232 retrieves rows from table F1 identified by row ids in the output of index scan 234. The next two iterations are performed similarly, except that the index scan 234 scans for key values 2, 3, respectively.

In-list iterator 222 is a pass-through operation. Its row source is the union-all of the output generated by each iteration of execution subplan 230. Nested loop join 204 joins the output rows of in-list iterator 222 with the output of execution subplan 240.

Execution plan 202 may be executed more efficiently for a variety of reasons. For, example, it defines fewer operations, thus requiring less initial memory.

Unfortunately, conventional DBMSs cannot use an in-list iterator to create more efficient execution plans for in-list queries in many circumstances. For example, a conventional DBMS cannot use the in-list iterator to generate execution plans for processing multi-column in-list queries, which are in-list queries that have multi-column in-list predicates. A multi-column in-list predicate is an in-list predicate, where each in-list value in the in-list is a tuple, and the column argument includes multiple columns. A column argument of an IN operator that contains multiple columns is referred to herein as a multi-column argument. The following query QEX is an example of a multi-column in-list query.

Select * from F1, F2
where F1.a=F2.d and
(F1.a, F1.c) IN ((1,2),(2,3))

Query QEX contains the multi-column in-list predicate (F1.a, F1.c) IN ((1,2),(2,3)). (F1.a, F1.c) is the multi-column argument for the predicate; the in-list ((1,2),(2,3)) is the multi-column in-list. Each tuple in the in-list is referred to as an in-list tuple.

Based on the foregoing, it is clearly desirable to provide a mechanism to generate more efficient execution plans for processing in-list predicates in many circumstances than current mechanisms provide.

SUMMARY OF THE INVENTION

Described herein are approaches for generating execution plans for database commands that include an in-list predicate. The approaches can be used to generate execution plans that exploit the power of in-list iterators in ways and under circumstances not previously supported by conventional DBMSs. According to an aspect of the present invention, an in-list iterator may be used with execution subplans for processing multi-column in-list queries. According to another aspect of the present invention, an in-list iterator is used with execution subplans that scan function-based indexes. According to yet another aspect of the present invention, the execution plans for a multi-column in-list query limit table scans to only table partitions that contain data that satisfy the query.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for processing in-list queries is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for generating execution plans for database commands that include an in-list predicate. The approaches can be used to generate more efficient execution plans that exploit the power of in-list iterators in ways and under circumstances not previously supported by conventional DBMSs. First, an in-list iterator may be used with execution subplans for processing multi-column in-list queries. Second, an in-list iterator is used with execution subplans that scan function-based indexes, where the function upon which the index is based is referenced by an in-list predicate. Function-based indexes shall be explained in greater detail.

The approaches described herein are not limited to improved uses of the in-list iterator. Approaches are also described for generating execution plans for a multi-column in-list query, where efficiency is improved by limiting table scans to portions of a table that contain data that satisfy the query.

Exemplary Database System

Figure 1:
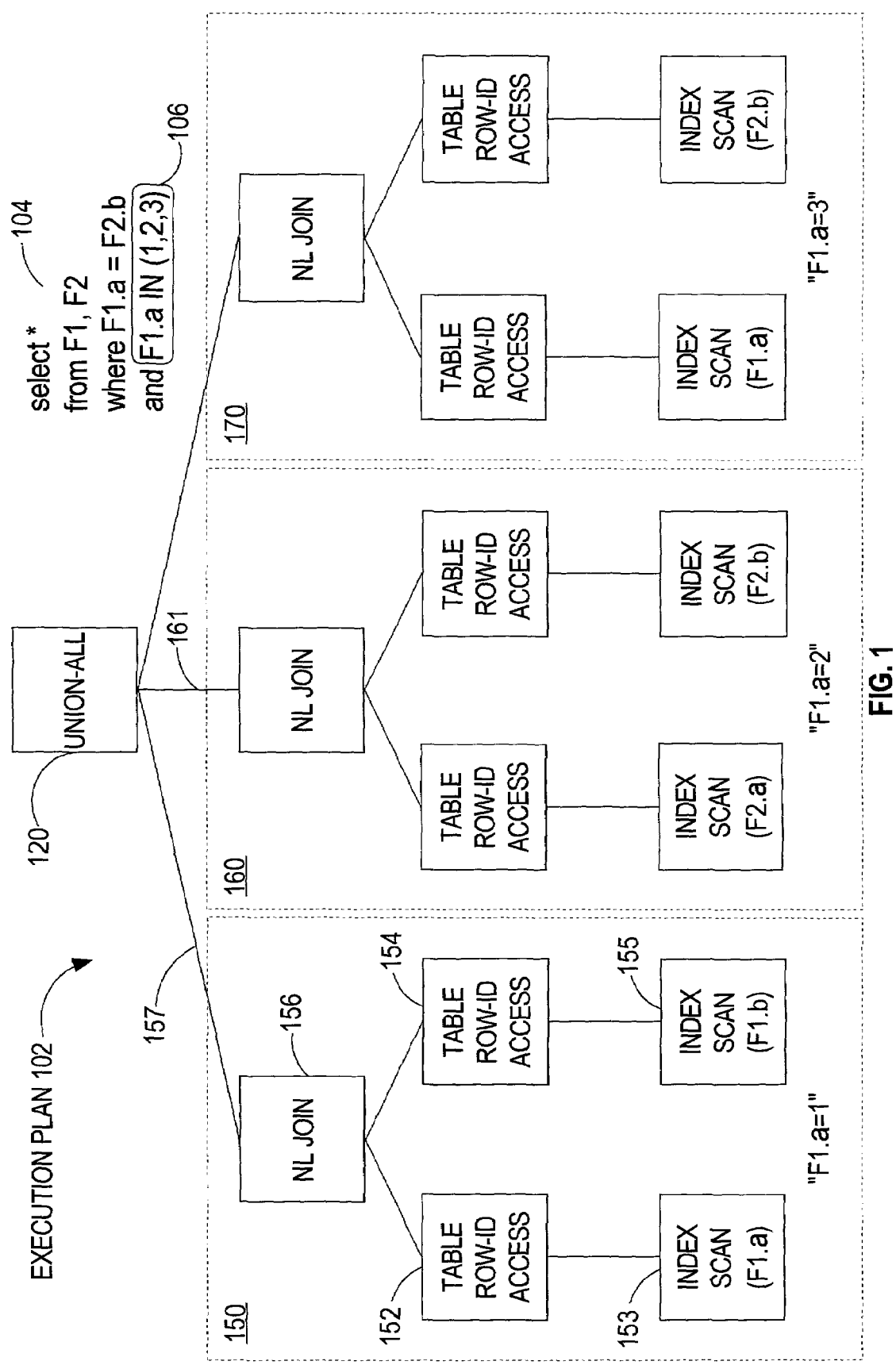
FIG. 1 is an execution plan diagram.
Figure 2:
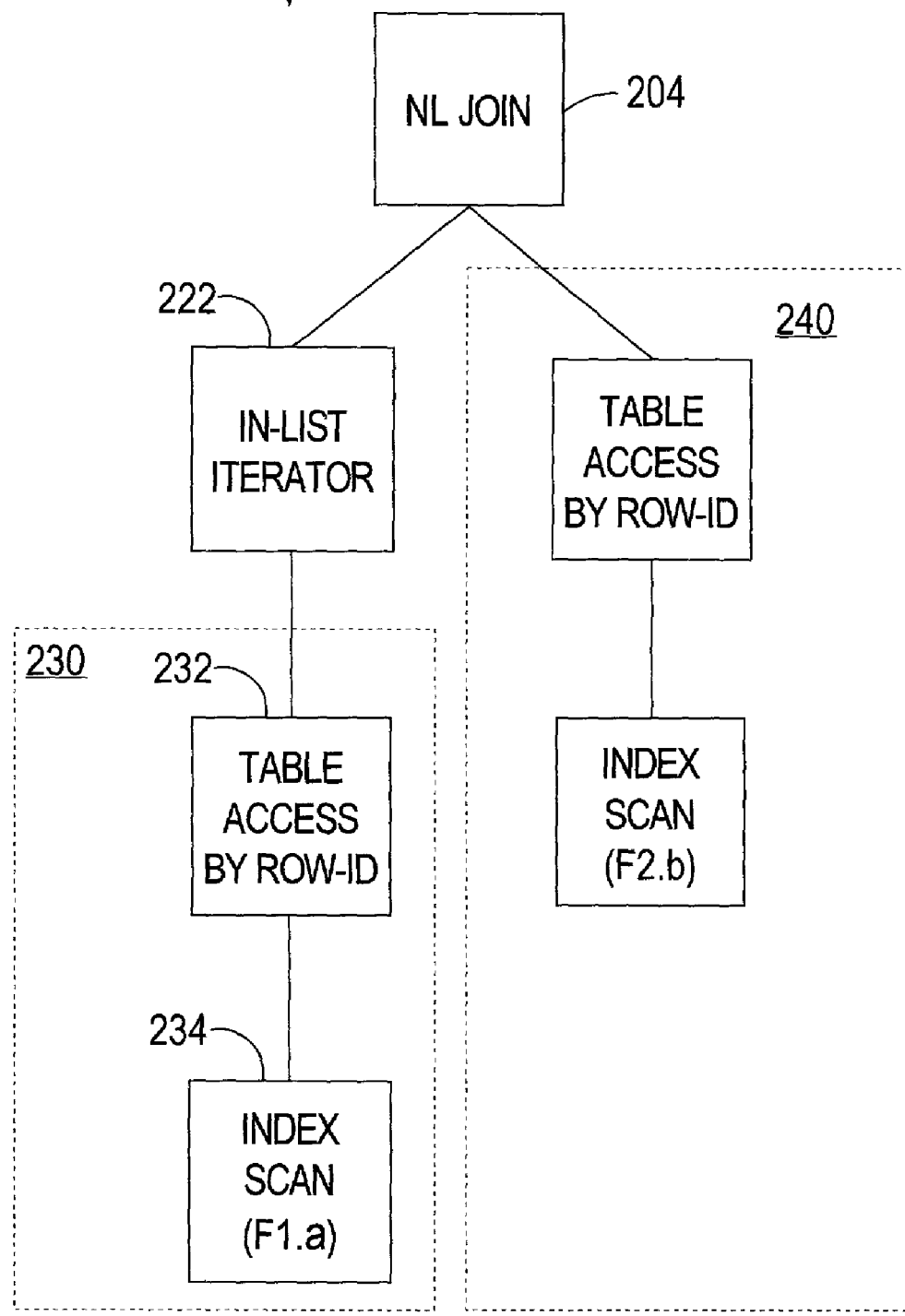
FIG. 2 is an execution plan diagram using an in-list iterator.
Figure 3:
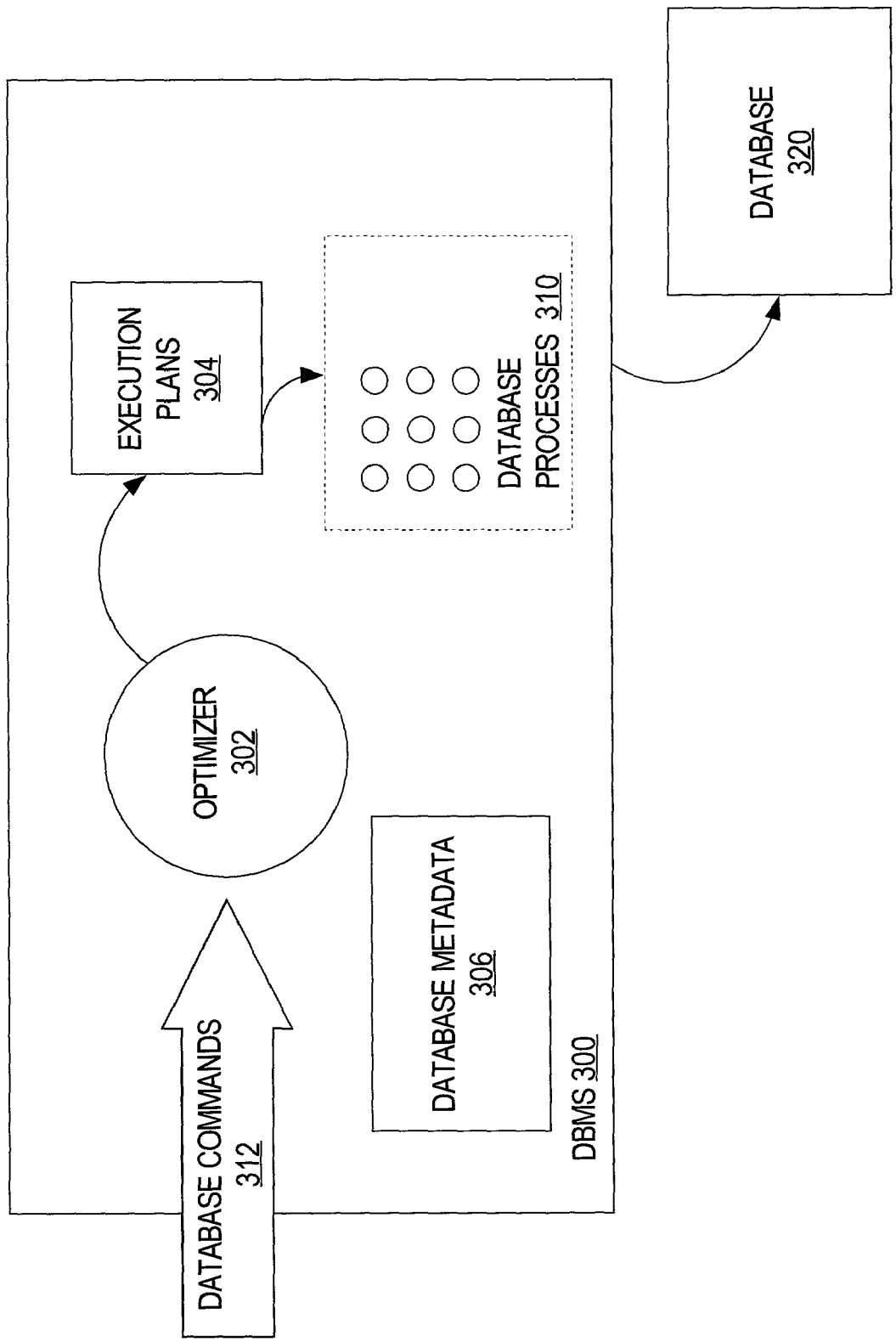
FIG. 3 is a block diagram of a DBMS upon which an embodiment of the present invention may be implemented.

FIG. 3 shows an exemplary DBMS 300 which may be used to implement an embodiment of the present invention. DBMS 300 receives and processes database commands 312. Database commands may be query statements written in SQL. Optimizer 302 represents one or more software components within DBMS 300 responsible for analyzing database commands and generating execution plans 304, which are optimized for efficient execution. Once an execution plan is generated, DBMS 300 assigns one or more database processes 310 to execute a plan operator of the execution plan. Many of the plan operators may be performed in parallel by a subset of database processes 310. Database processes access database 320 according to the execution plan.

Database metadata 306 is metadata that defines database objects in database 320. Database metadata 306 defines database objects such as tables, indexes, functions, and data files that are and may be used to store database data. Database metadata 306 also defines the structure of database objects, such as the columns of a table or the table columns indexed by an index. Database metadata 306 may also contain data describing properties of the database objects that change over time, such as the database object size (e.g. the number of rows), or the cardinality data contained in the database object.

To generate an optimal execution plan for a database command, optimizer 302 may parse and decompose a database command into its constituent parts, which are examined in order to determine how to form the execution plan. The constituent parts include operators, references to tables, views, columns, join conditions and other predicates and their arguments. In addition, the optimizer examines database metadata 306 to determine what database objects may be used to form an optimal execution plan.

For example, DBMS 300 may receive a database command in the form of a query. The query references table F for access and defines a predicate requiring column F.a to equal a particular value. Optimizer 302 decomposes the query into its constituent parts, thereby determining that the query references table F and contains the predicate restricting column F.a. Optimizer 302 examines the database metadata 306 to search for an index on column F.a, finding that index FIx indexes column F.a. Optimizer 302 then creates an execution plan that includes an index-scan of FIx.

In another embodiment, DBMS 300 may first pass a query it receives to a query rewrite mechanism, which in turn generates a transformed query. The transformed query, while returning the same data requested by the originally received query, may be executed more efficiently. The transformed query is then passed to optimizer 302. Additionally, optimizer 302 may receive a query already decomposed into its constituent parts.

For purposes of exposition, the present invention is illustrated using execution plans generated to execute queries. However, the present invention is not limited to generating execution plans for database commands that are queries.

Illustrative Database Objects

Figure 4:
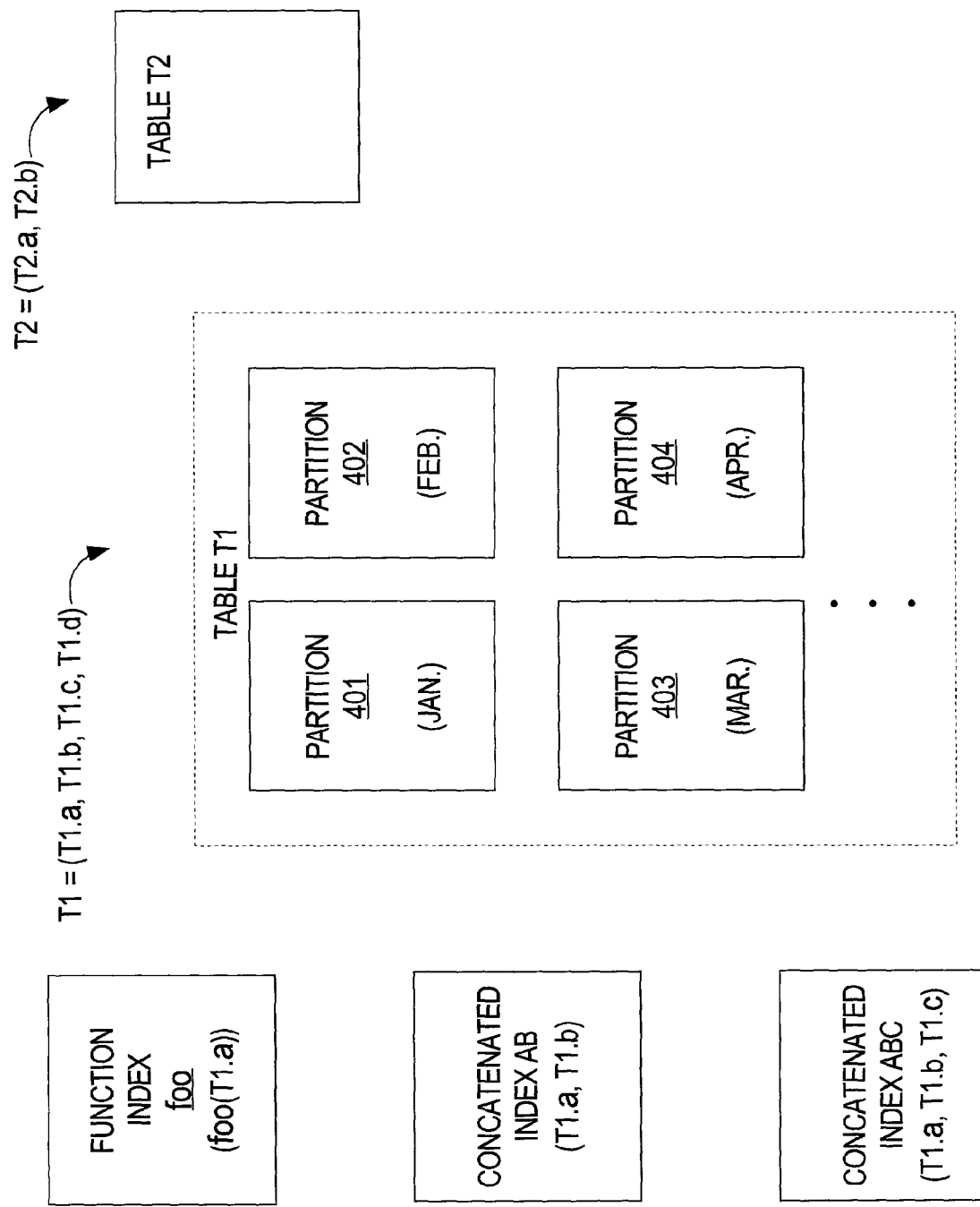
FIG. 4 is a block diagram of various database objects used to illustrate embodiments of the present invention.

FIG. 4 is a block diagram showing database objects used to illustrate various embodiments of the present invention. Referring to FIG. 4, it depicts table T1 and table T2. Table T1 includes columns T1.a, T1.b, T1.c, and T1.d, as well as other columns not shown. Table T2 includes columns T2.a and T2.b.

Concatenated index AB and concatenated index ABC index multiple columns of T1. Specifically, concatenated index AB indexes columns T1.a and T1.b, and concatenated index ABC indexes columns T1.a, T1.b, T1.c.

Function index foo is a function-based index. A function-based index indexes the output values that result from applying an "index function" to the values in one or more key columns. The function and the one or more key columns are together referred to herein as the function key of the function index. The function key of index foo is foo(T1.a, T1.b). The following example illustrates a function index.

In table T1, row RA contains 1 in T1.a and 2 in T1.b, and row RB contains 3 in T1.a and 4 in T1.b. When the input of foo( ) is (1,2), the output of foo( ) is 'STR1'; when the input is (3,4), the output of foo( ) is "STR2". Function index foo indexes the key values 'STR1' and 'STR2' to rows RA and RB, respectively.

Table T1 is a partitioned object. To partition a table, such as T1, the table is divided up into sub-tables, referred to as "partitions". Table T1 contains partitions 401, 402, 403, 404, and other partitions not shown. The most common form of partitioning is referred to as range partitioning. With range partitioning, each individual partition corresponds to a particular range of values for one or more columns of the table. These columns are referred to as partition key columns. The criteria used to partition a database object is defined by database metadata 306.

T1.c is an example of a partition key column used for range partitioning. T1.c stores date values that fall within a particular year, and the table is divided into twelve partitions, each of which corresponds to a month of that year. All rows in T1.c that have a particular date that falls within a particular month are inserted into the partition that corresponds to that month. In this example, partitioning the table increases the efficiency of processing queries that select rows based on the date value into T1.c. For example, if a particular query selected all rows where date values in T.c fall into January, then the only partition that would have to be scanned is partition 401, the partition associated with January. The process of limiting access to a subset of partitions that contain needed data is referred to as partition pruning.

Figure 5:
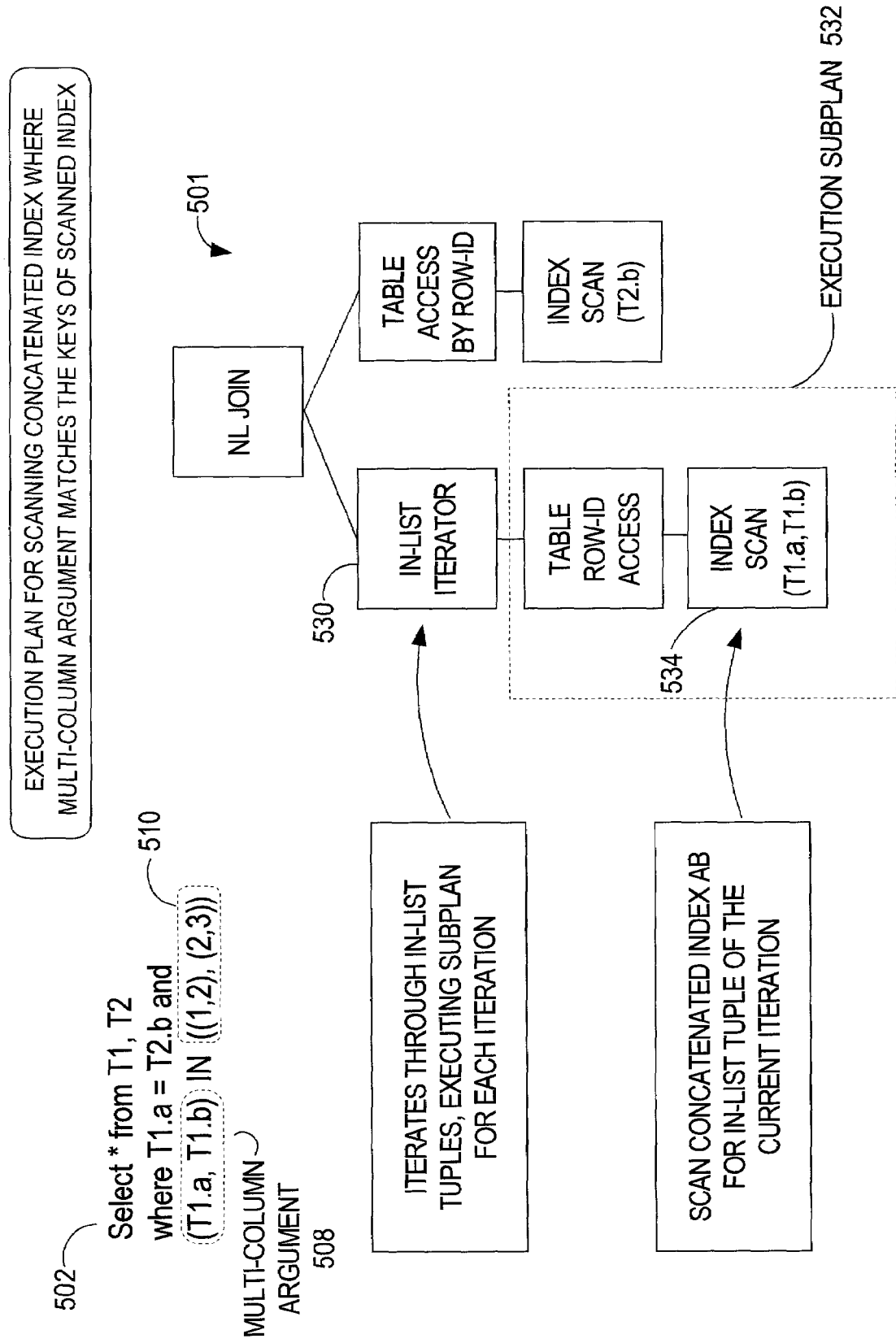
FIG. 5 is an execution plan diagram of an execution plan for processing a multi-column in-list query according to an embodiment of the present invention.

Execution Plans for In-List Database Queries that Exploit a Multi-Column Iterator FIG. 5 shows execution plan 501. Execution plan 501 is an example of an execution plan for a multi-column in-list query that has a multi-column argument that contains only the keys of a concatenated index. Query 502 includes multi-column in-list 510 and multi-column argument 508. Multi-column argument 508 contains columns T1.a and T1.b, which are the keys of index AB. As part of analyzing query 502, optimizer 302 references database metadata 306 to determine that the keys of index AB match the columns of multi-column argument 508.

Execution plan 501 includes in-list iterator 530. In-list iterator 530 iterates through each of the in-list tuples in multi-column in-list 510, executing subplan 532 in each iteration. An iteration is a set of operations that are repeated for each of a set of values (e.g. in-list tuples); in this case, the repeated operations are those defined by execution subplan 532. The value for which an iteration is occurring is referred to as the current value with respect to the iteration. During each iteration, index scan 534 scans concatenated index AB for rows indexed to the current tuple for the iteration. For example, when executing the in-list iterator 530, in the first iteration, index scan 534 scans rows indexed to current tuple (1,2), and in the next iteration, the rows indexed to current tuple (2,3).

Use of in-list iterators is not limited to execution of subplans that include an index scan of an index whose keys match, one for one, the columns of a multi-column argument. In-list iterators may also be used for execution subplans that include an index scan, when the keys of an index are a subset of the columns of a multi-column argument, or when a multi-column argument includes columns that are a subset of the keys of an index.

Figure 6:
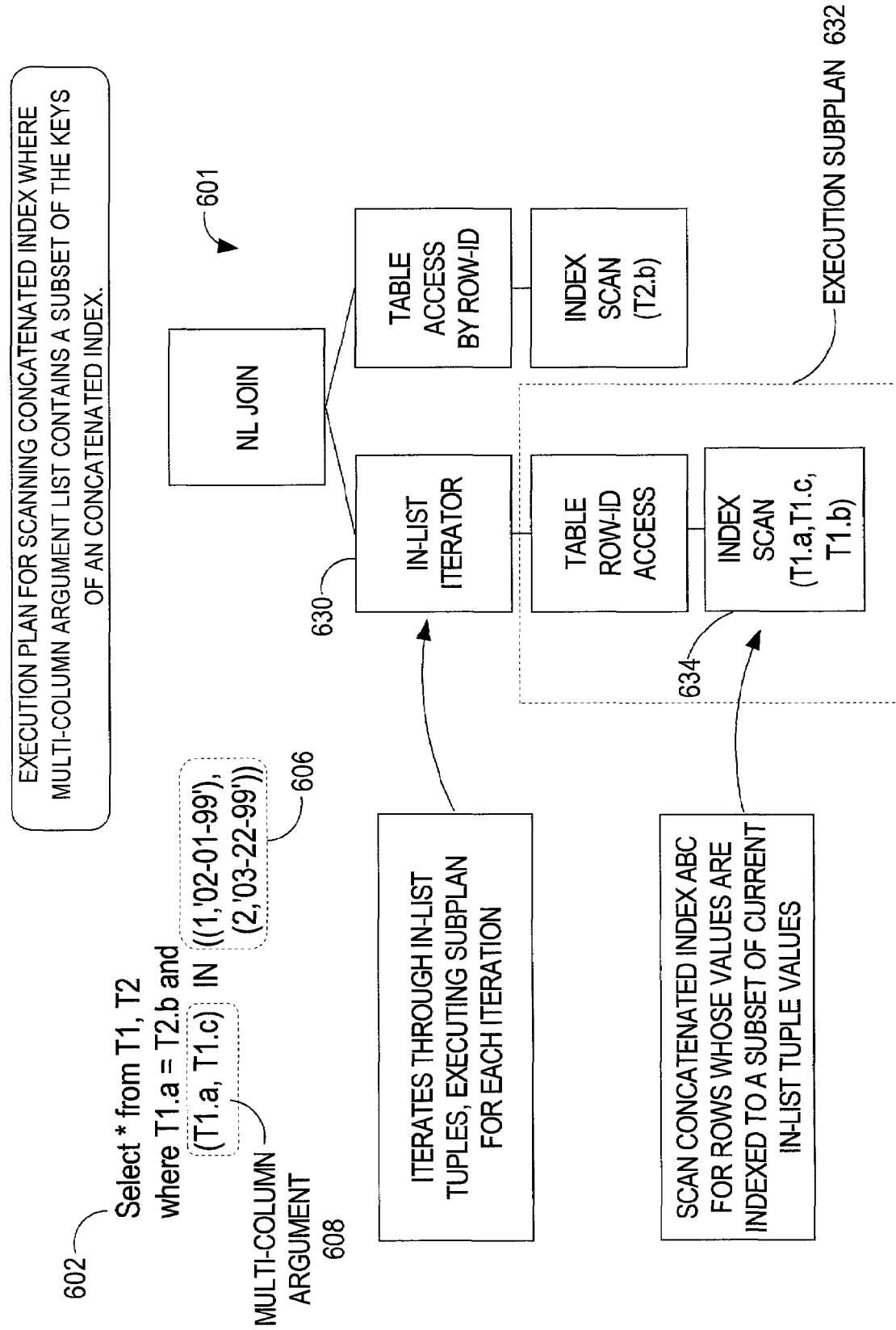
FIG. 6 is an execution plan diagram of an execution plan for processing a multi-column in-list query according to an embodiment of the present invention.

FIG. 6 shows an execution plan covering the case where an index is used when a multi-column argument includes only a subset of the keys of the index. Referring to FIG. 6, execution plan 601 is an execution plan for executing in-list query 602. Index scan 634 in execution subplan 632 scans concatenated index ACB, which has as keys columns T1.a, T1.c, and T1.b. Multi-column argument 808 includes keys T1.a and T1.c, a subset of the keys of index ACB. The one or more columns in a multi-column argument that are keys of an index are referred to as intersecting columns with respect to that multi-column argument and index.

Execution plan 601 includes in-list iterator 630. In-list iterator 630 iterates through each of the in-list tuples in multi-column in-list 606, executing execution subplan 632 in each iteration.

In each iteration, index scan 634 scans index ACB for rows indexed to the intersecting columns for the particular tuple values for the iteration. For example, when executing the in-list iterator 630, in the first iteration, index scan 634 scans rows indexed to tuple (1,'02-01-99'), that is, rows that contain 1 and '02-01-99' in columns T1.a and T1.c, respectively. In the next iteration, index scan 634 scans for the rows indexed to tuple (2,'03-22-99').

Figure 7:
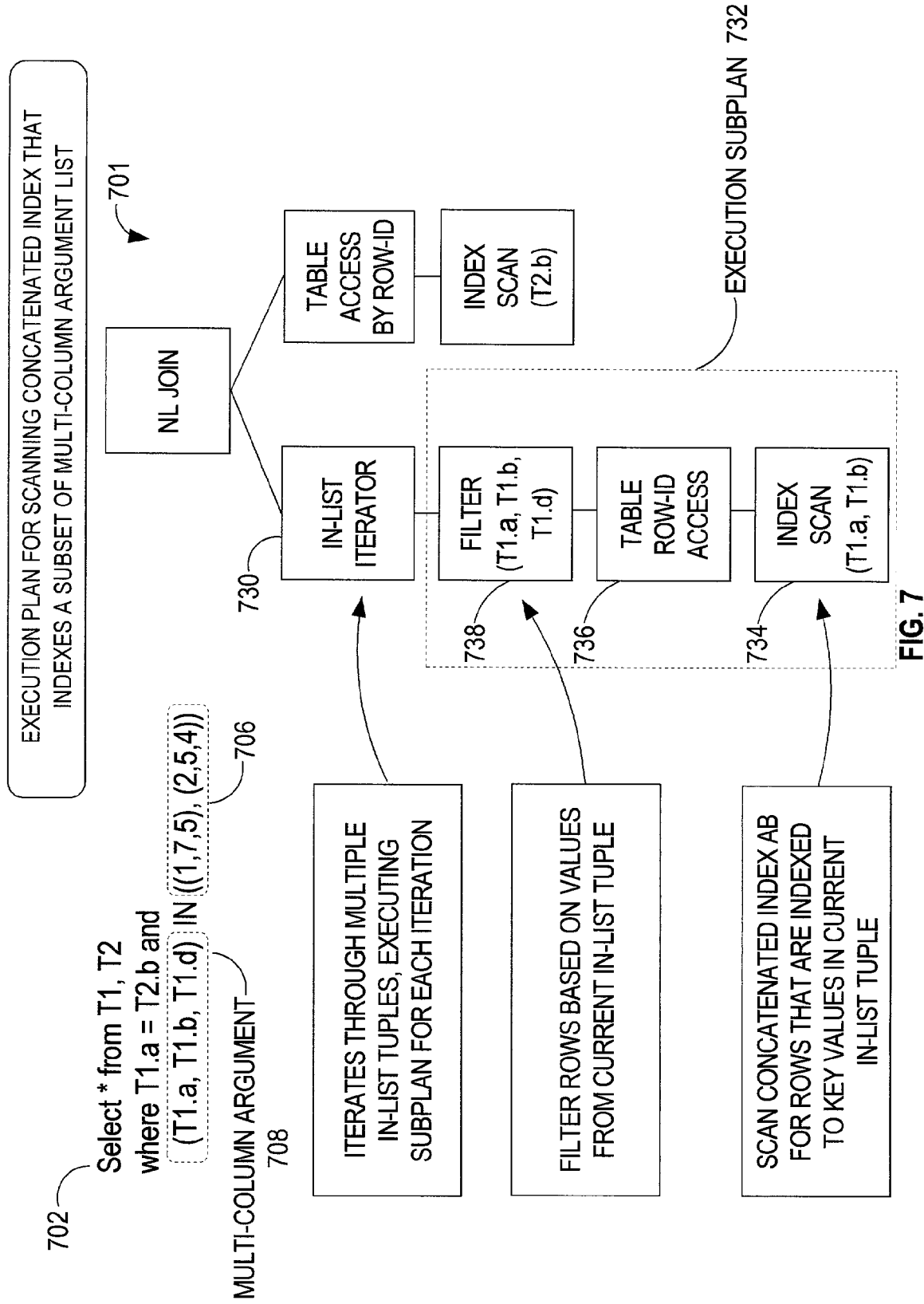
FIG. 7 is an execution plan diagram of an execution plan for processing a multi-column in-list query according to an embodiment of the present invention.

FIG. 7 shows an execution plan covering the case where an index is used when the index's keys are only a subset of the columns of a multi-column argument list. Referring to FIG. 7, execution plan 701 is an execution plan for executing query 702. Index scan 734 in execution plan 701 scans concatenated index AB, which has as keys columns T1.a and T1.b. These keys are a subset of the multi-column argument 708, which includes columns T1.a, T1.b, and T1.d.

Execution plan 701 includes in-list iterator 730. In-list iterator 730 iterates through each of the in-list tuples in multi-column in-list 706, executing subplan 732 in each iteration. During each iteration, index scan 734 scans index AB for rows indexed to the current in-list tuple values that correspond to the intersecting columns. For example, when executing the in-list iterator 730, in the first iteration, index scan 734 scans for rows indexed to (1,7), in the next iteration, for the rows indexed to tuple (2,5).

The output row ids of index scan 734 may identify rows that do not satisfy the multi-column in-list predicate in query 702. Filter 738 eliminates these rows.

Filter 738 is an execution plan operator referred to herein as a filter. A filter filters out rows in a row source that do not satisfy one or more conditions. Typically these conditions are defined by or derived from predicates in queries. The output of a filter operator is the rows in a row source that do satisfy the criteria. Filter 738 filters rows that do not satisfy the multi-column in-list predicate in query 702 for the current in-list tuple.

Using Function Indexes for In-List Queries

Figure 8:
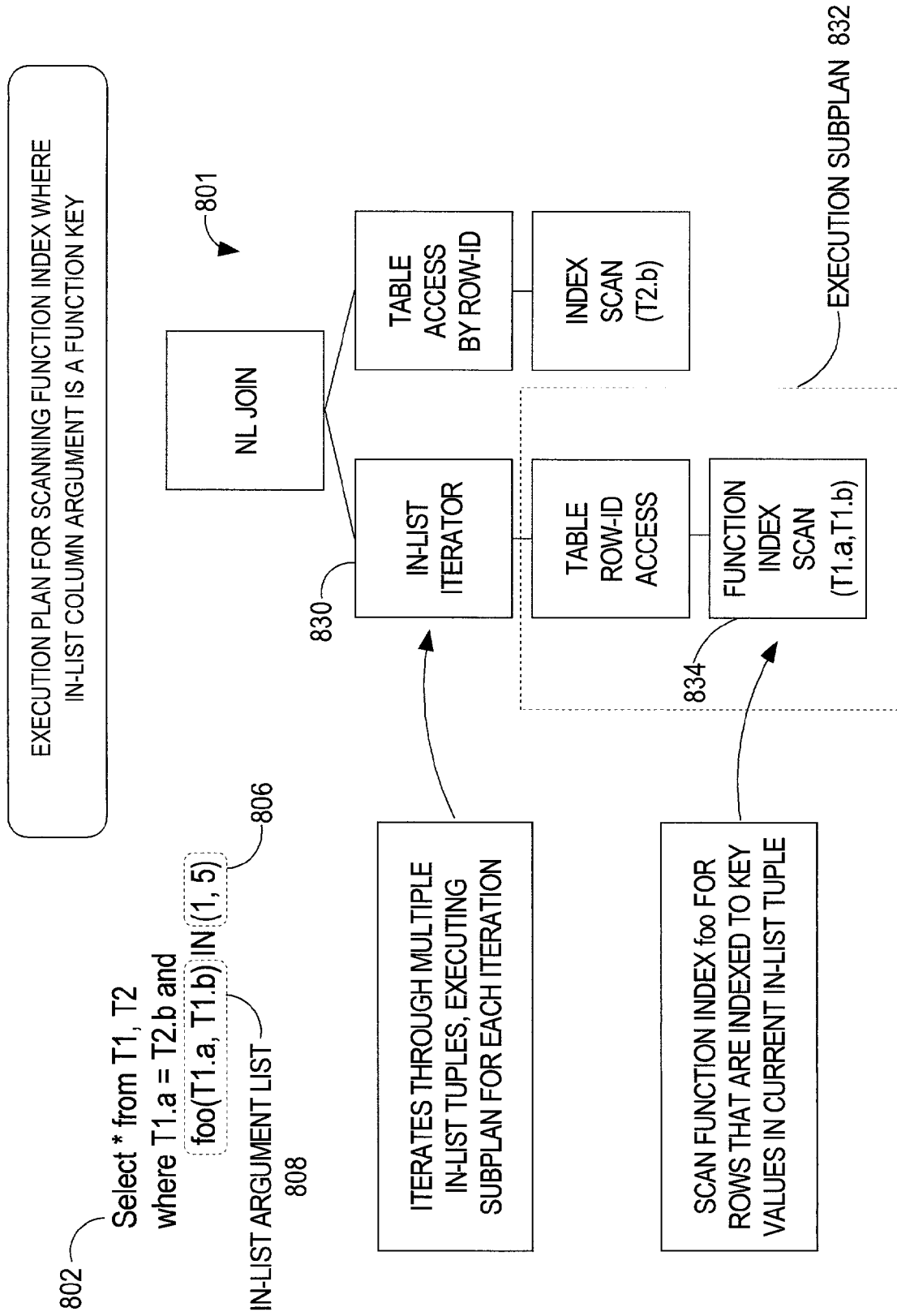
FIG. 8 is an execution plan diagram of an execution plan for processing an in-list query that is based on an in-list predicate that references a key of a function-based index according to an embodiment of the present invention.

FIG. 8 is an execution plan diagram showing execution plan 801. Execution plan 801 is an example of an execution plan for an in-list query having an in-list predicate that references a function key of a function index. When optimizer 302 analyzes in-list query 802, it determines that in-list query 802 contains in-list column argument 808, and examines database metadata 306 to determine that the argument is a function key of function index foo.

Execution plan 801 includes in-list iterator 830. In-list iterator 830 iterates through each of the in-list values in in-list 806, executing subplan 832 in each iteration. During each iteration, function index scan 834 scans function foo for rows indexed to the current in-list tuple value. For example, in the first iteration, index scan 834 scans for rows whose values in T1.a and T1.b are indexed to the function index foo.

Execution plans may be generated for multi-column in-list queries as well. For example, if in-list query 802 contained a multi-column in-list predicate in place of its current in-list predicate, and a multi-column in-list argument referenced the function key of foo, optimizer 302 generates an execution plan similar to execution plan 701, where the execution plan contains an execution subplan similar to execution subplan 732. The execution subplan would contain both an index scan operator that scanned function index foo, and a filter operator that filters rows based on the current in-list tuple.

Partition Pruning for Multi-Column In-List Predicates

Figure 9:
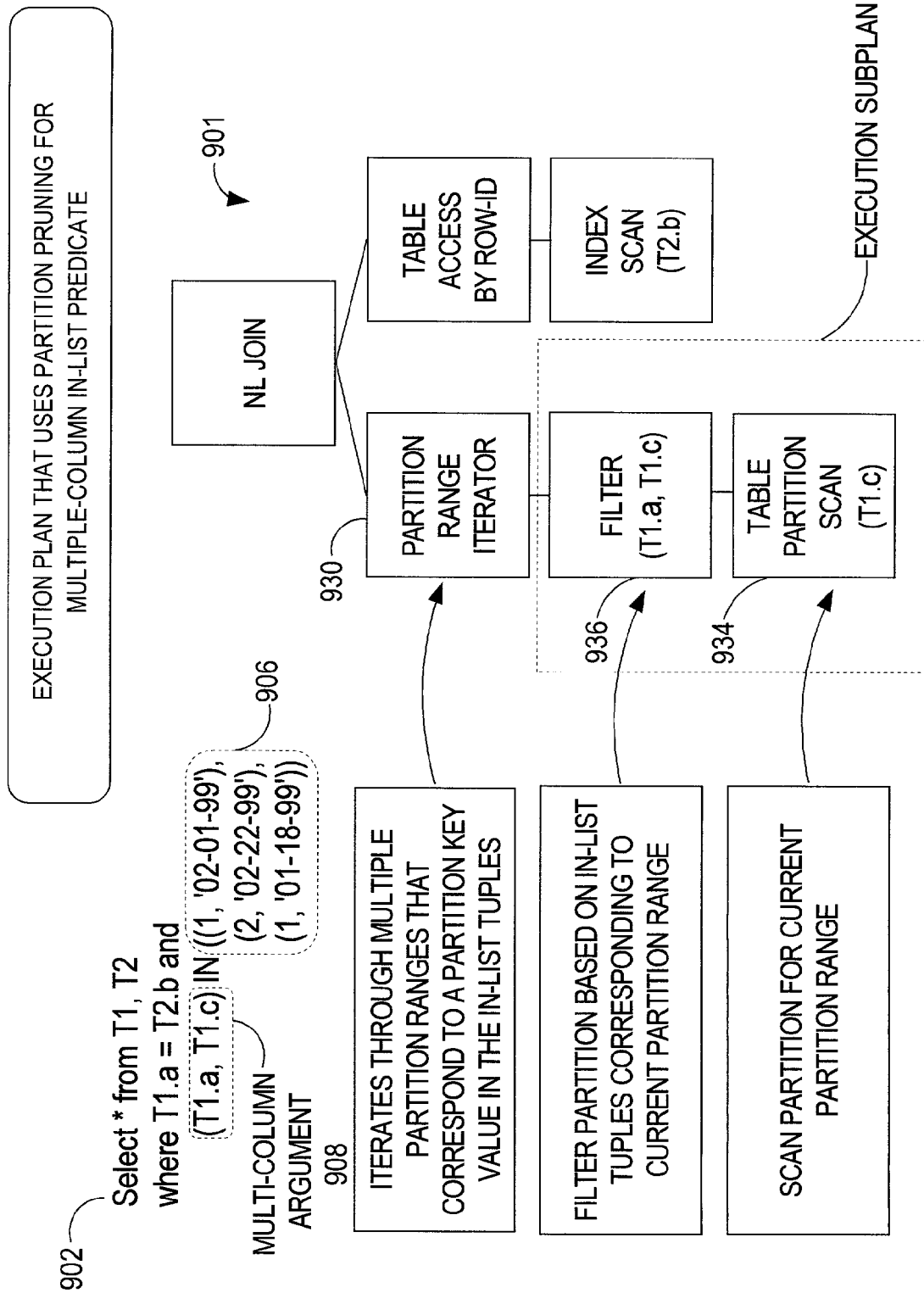
FIG. 9 is an execution plan diagram of an execution plan for processing an in-list query based on partition pruning according to an embodiment of the present invention.

In addition to generating execution plans for multi-column in-list predicates that exploit indexes, optimizer 302 may generate plans that exploit partitioning through partition pruning. FIG. 9 is an execution plan diagram showing execution plan 901, an execution plan that exploits the power of partition pruning.

Execution plan 901 is an execution plan for multi-column in-list query 902. Multi-column argument 908 of in-list query 902 contains partition key T1.c.

Execution plan 901 includes partition range iterator 930. A partition range iterator iterates through partition ranges that are defined by predicates, executing an execution subplan in each iteration for the "current partition range". A partition range may correspond to one or more in-list tuples. For example, tuple (1,'01-18-99') corresponds to the partition range for January, partition 401. Tuples (1,'02-01-99') and (2,'02-22-99') correspond to the partition range of table T1 for February, partition 402. In the first iteration, table partition scan 934 scans the rows in partition 401, the partition corresponding to January. A filter 936 filters rows that satisfy criteria based on the in-list tuple that corresponds to January, tuple (1,'01-18-99'). The criteria is the equivalent of the predicate (T1.a, T1.c) IN ((1,'01-18-99')). In the second iteration, table partition scan 934 scans the rows in partition 402, the partition corresponding to February. Filter 936 filters rows that satisfy criteria based on the in-list tuples that correspond to the current partition range 402, tuples (1,'02-01-99') and (2,'02-22-99'). The criteria is the equivalent of the predicate (T1.a, T1.c) IN ((1,'02-01-99'), (1,'02-22-99')).

Hardware Overview

Figure 10:
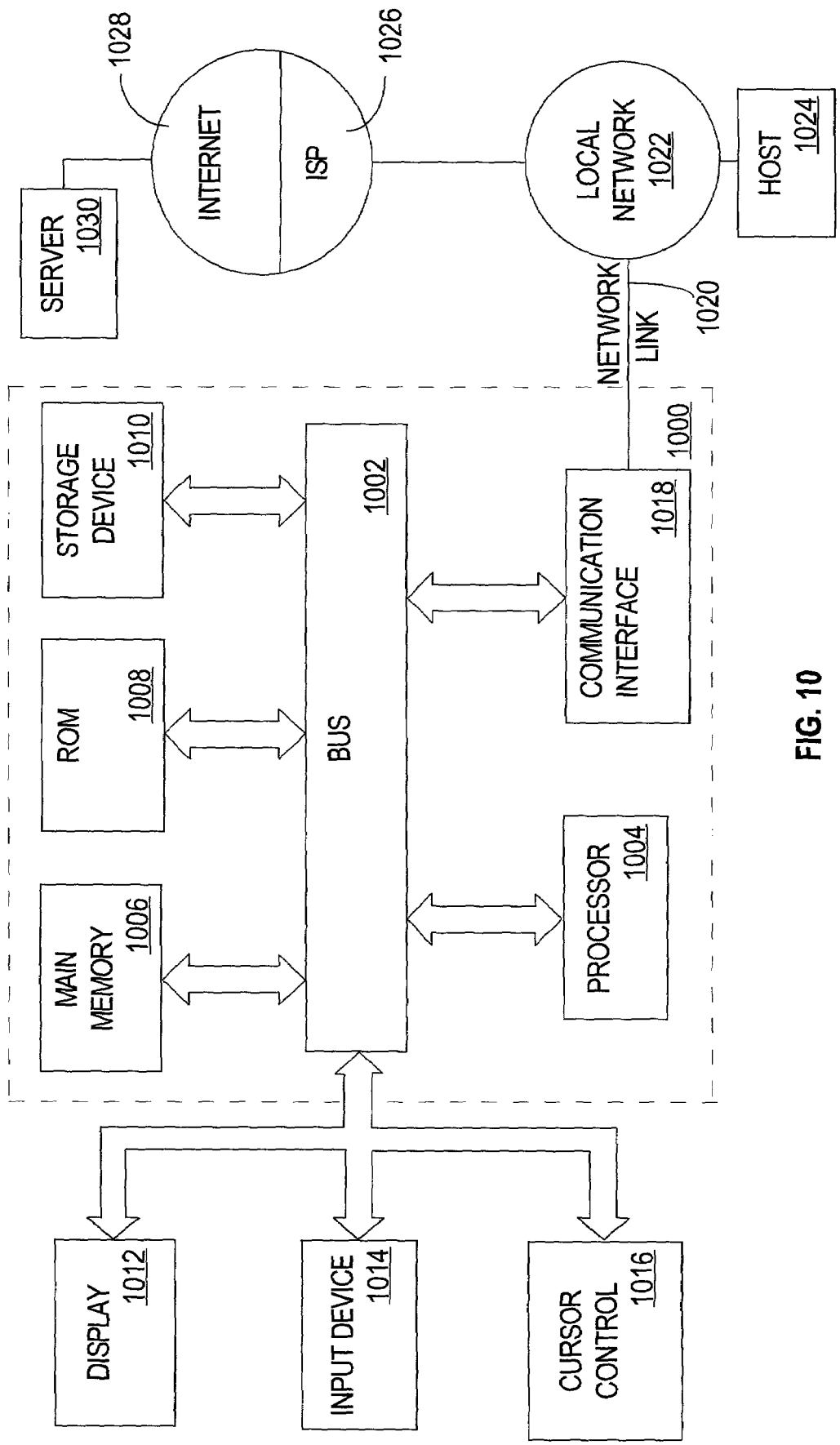
FIG. 10 is a computer system that may be used to implement an embodiment of the present invention.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for creating execution plans, the method comprising the computer-implemented steps of:

receiving a database command that contains a predicate based on an IN operator, wherein a first argument of said IN operator is based on a multi-column in-list and a second argument of said IN operator references a plurality of columns, wherein said multi-column in-list includes one or more tuples, and wherein each of said one or more tuples includes a plurality of values that correspond to said plurality of columns; and forming an execution plan based on said database command, said execution plan including a first plan operator, said first plan operator specifying operations for:
  performing a plurality of iterations based on values in said multi-column in-list, and
  for each iteration, executing an execution subplan based on one or more values of said multi-column in-list.

2. The method of claim 1, wherein:
the step of forming an execution plan includes causing said execution subplan to include a second plan operator for scanning an index;
said index has a plurality of keys; and
the plurality of keys and the plurality of columns are the same columns.

3. The method of claim 1, wherein:
the step of forming an execution plan includes causing said execution subplan to include a second plan operator for scanning an index;
said index has a plurality of keys; and
the plurality of keys is a subset of the plurality of columns.

4. The method of claim 1, wherein:
the step of forming an execution plan includes causing said execution subplan to include a second plan operator for scanning an index;
said index has a plurality of keys; and
the plurality of columns includes only a subset of the plurality of keys.

5. A method for creating execution plans, the method comprising the computer-implemented steps of:
  receiving a database command that contains a predicate based on an IN operator, wherein a first argument of said IN operator is based on a function;
  determining that output values that result from applying said function are indexed by an index;
  forming an execution plan based on said database command; and
  wherein said execution plan includes a first plan operator that defines a scan operation of said index based on said first argument.

6. The method of claim 5, wherein a second argument of said IN operator references a plurality of tuples.

7. The method of claim 5, wherein said execution plan includes a second plan operator that filters output rows of said first plan operator.

8. A method for creating execution plans, the method comprising the computer-implemented steps of:
  receiving a database command that contains a predicate based on an IN operator;
  wherein said database command references a table that is partitioned into a plurality of partitions based on a partition key;
  wherein a first argument of said IN operator is based on a multi-column in-list;
  wherein a second argument of said IN operator references the partition key;
  determining an execution plan based on said database command, said execution plan including a first plan operator, said first plan operator specifying operations that limit scanning to partitions having rows containing a partition key value in said multi-column in-list.

9. The method of claim 8, wherein said second argument references another column in addition to said partition key.

10. The method of claim 8, wherein said table is partitioned based on another key.

11. A computer-readable storage medium carrying one or more sequences of instructions for creating execution plans, wherein execution of the one or more sequences of instructions by one or more processors causes the one or more processors to perform the steps of:
  receiving a database command that contains a predicate based on an IN operator, wherein a first argument of said IN operator is based on a multi-column in-list and a second argument of said IN operator references a plurality of columns, wherein said multi-column in-list includes one or more tuples, and wherein each of said one or more tuples includes a plurality of values that correspond to said plurality of columns; and
  forming an execution plan based on said database command, said execution plan including a first plan operator, said first plan operator specifying operations for:
    performing a plurality of iterations based on values in said multi-column in-list, and
    for each iteration, executing an execution subplan based on one or more values of said multi-column in-list.

12. The computer-readable storage medium of claim 11, wherein:
the step of forming an execution plan includes causing said execution subplan to include a second plan operator for scanning an index;
said index has a plurality of keys; and
the plurality of keys and the plurality of columns are the same columns.

13. The computer-readable storage medium of claim 11, wherein:
the step of forming an execution plan includes causing said execution subplan to include a second plan operator for scanning an index;
said index has a plurality of keys; and
the plurality of keys is a subset of the plurality of columns.

14. The computer-readable storage medium of claim 11, wherein:
the step of forming an execution plan includes causing said execution subplan to include a second plan operator for scanning an index;
said index has a plurality of keys; and
the plurality of columns includes only a subset of the plurality of keys.

15. A computer-readable storage medium carrying one or more sequences of instructions for creating execution plans, wherein execution of the one or more sequences of instructions by one or more processors causes the one or more processors to perform the steps of:
  receiving a database command that contains a predicate based on an IN operator, wherein a first argument of said IN operator is based on a function;
  determining that output values that result from applying said function are indexed by an index;
  forming an execution plan based on said database command; and
  wherein said execution plan includes a first plan operator that defines a scan operation of said index based on said first argument.

16. The computer-readable storage medium of claim 15, wherein a second argument of said IN operator references a plurality of tuples.

17. The computer-readable storage medium of claim 15, wherein said execution plan includes a second plan operator that filters output rows of said first plan operator.

18. A computer-readable storage medium carrying one or more sequences of instructions for creating execution plans, wherein execution of the one or more sequences of instructions by one or more processors causes the one or more processors to perform the steps of:

receiving a database command that contains a predicate based on an IN operator;

wherein said database command references a table that is partitioned into a plurality of partitions based on a partition key;

wherein a first argument of said IN operator is based on a multi-column in-list;

wherein a second argument of said IN operator references the partition key;

determining an execution plan based on said database command, said execution plan including a first plan operator, said first plan operator specifying operations that limit scanning to partitions having rows containing a partition key value in said multi-column in-list.

19. The computer-readable storage medium of claim 18, wherein said second argument references another column in addition to said partition key.

20. The computer-readable storage medium of claim 18, wherein said table is partitioned based on another key.

* * * * *